United States Patent [19]
Tate

[11] 3,738,683
[45] June 12, 1973

[54] AN EXTENDIBLE RETRACTABLE VEHICULAR HITCH ASSEMBLY

[76] Inventor: James E. Tate, 926 Regency Drive, Richardson, Tex. 75080

[22] Filed: July 28, 1971

[21] Appl. No.: 166,869

[52] U.S. Cl............................. 280/478 R, 280/485
[51] Int. Cl.............................................. B60d 1/06
[58] Field of Search .................. 280/477, 478, 483, 280/484, 485

[56] References Cited
UNITED STATES PATENTS

| | | | |
|---|---|---|---|
| 2,459,731 | 1/1949 | Wymore | 280/477 UX |
| 2,500,686 | 3/1950 | Jontz | 280/483 X |
| 2,517,047 | 8/1950 | Spitler | 280/483 X |
| 3,279,823 | 10/1966 | Thouvenelle | 280/421 |

FOREIGN PATENTS OR APPLICATIONS

| | | | |
|---|---|---|---|
| 145,555 | 5/1936 | Austria | 280/483 |
| 626,106 | 2/1936 | Germany | 280/484 |

*Primary Examiner*—Leo Friaglia
*Attorney*—Ralph E. Zimmerman

[57] ABSTRACT

An extendible retractable vehicular hitch assembly with means to extend the vehicular hitch in multi-directions, the said extendible vehicular hitch having mounting support means and means to hold it in a retracted position.

4 Claims, 5 Drawing Figures

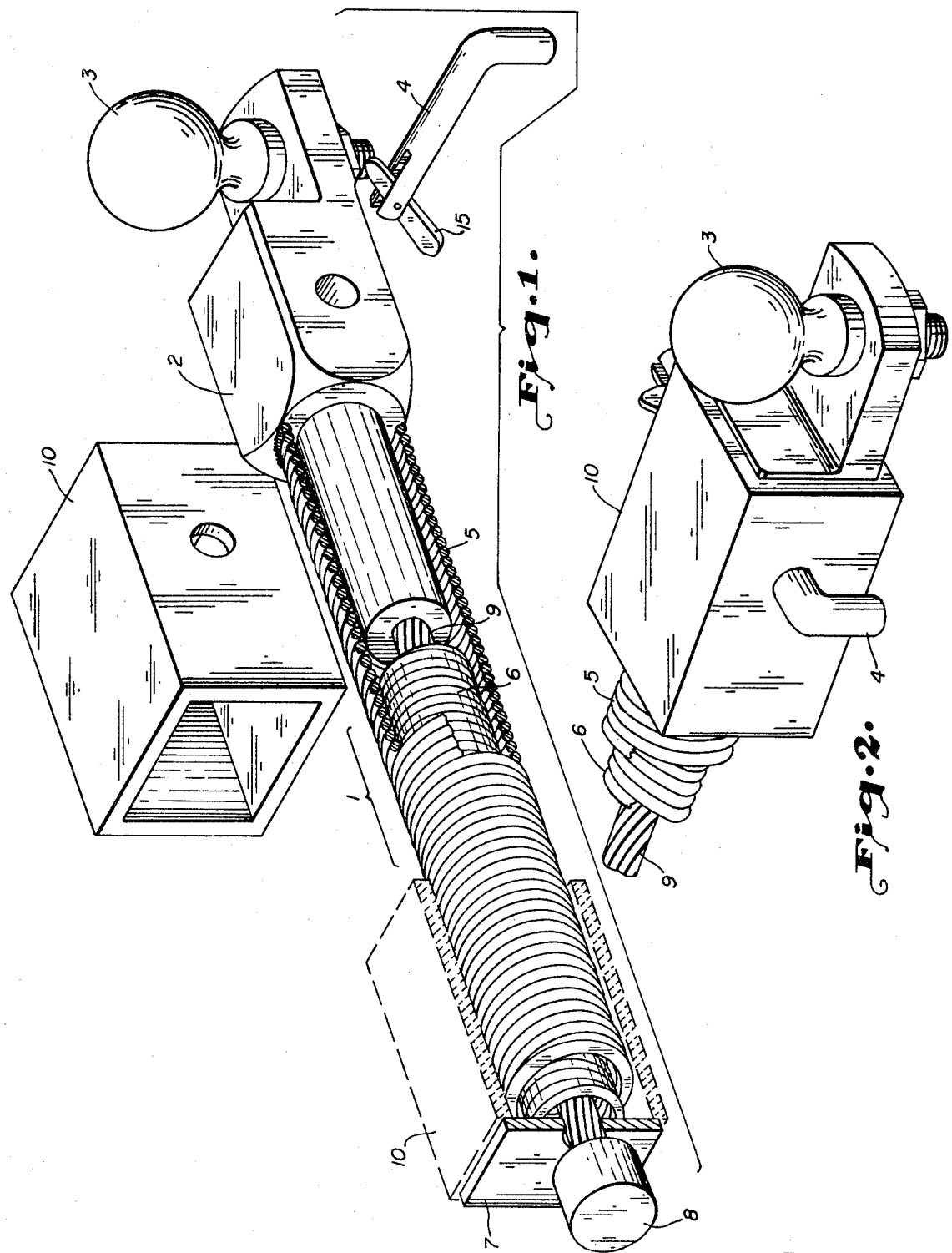

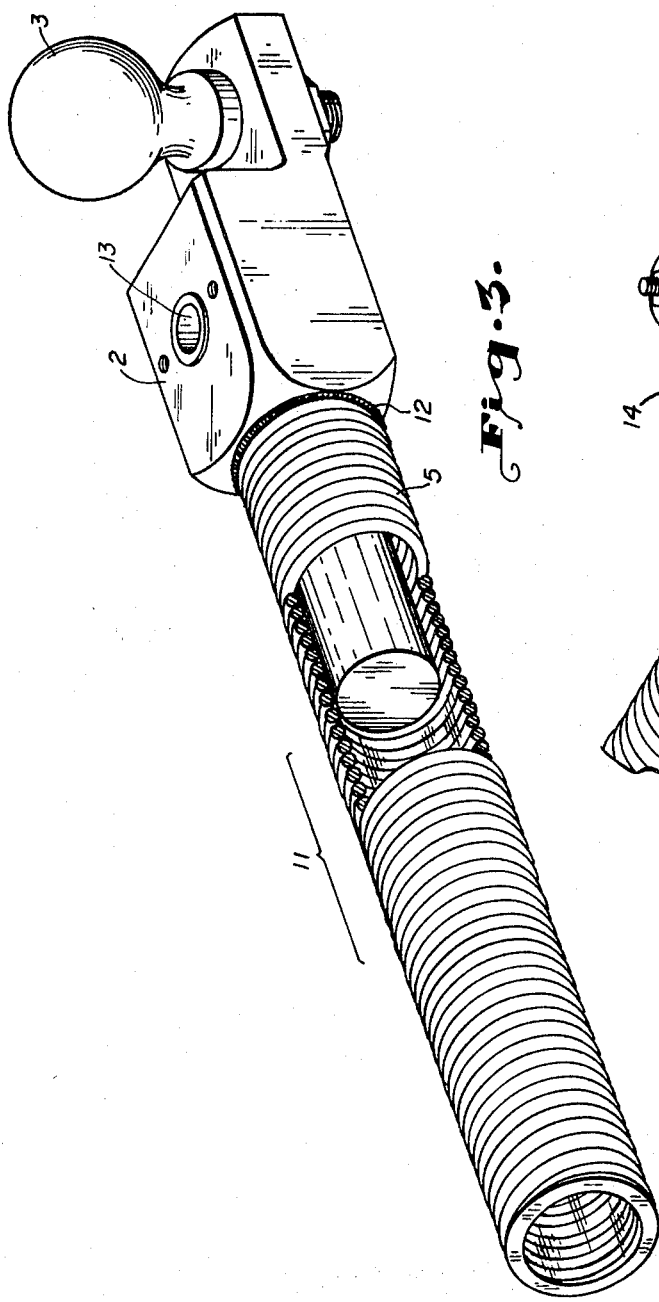
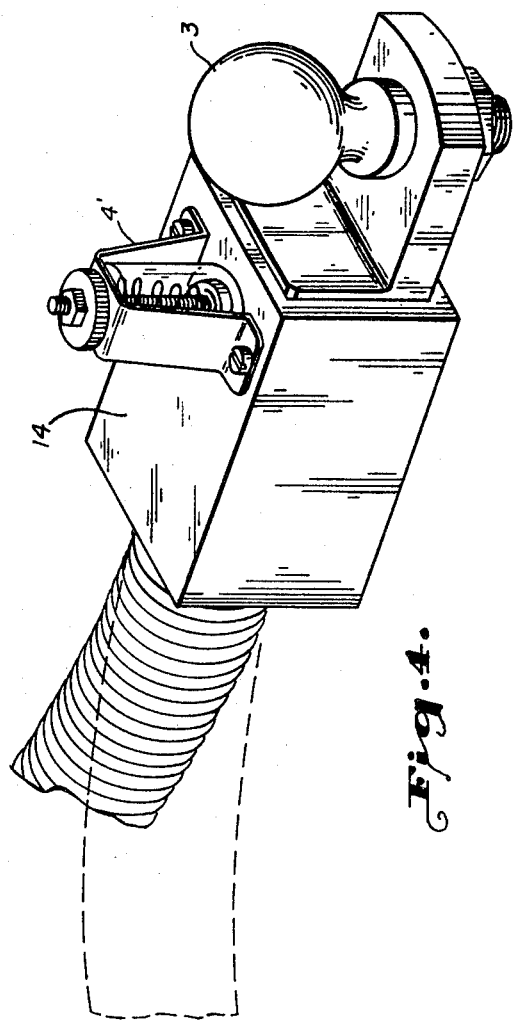

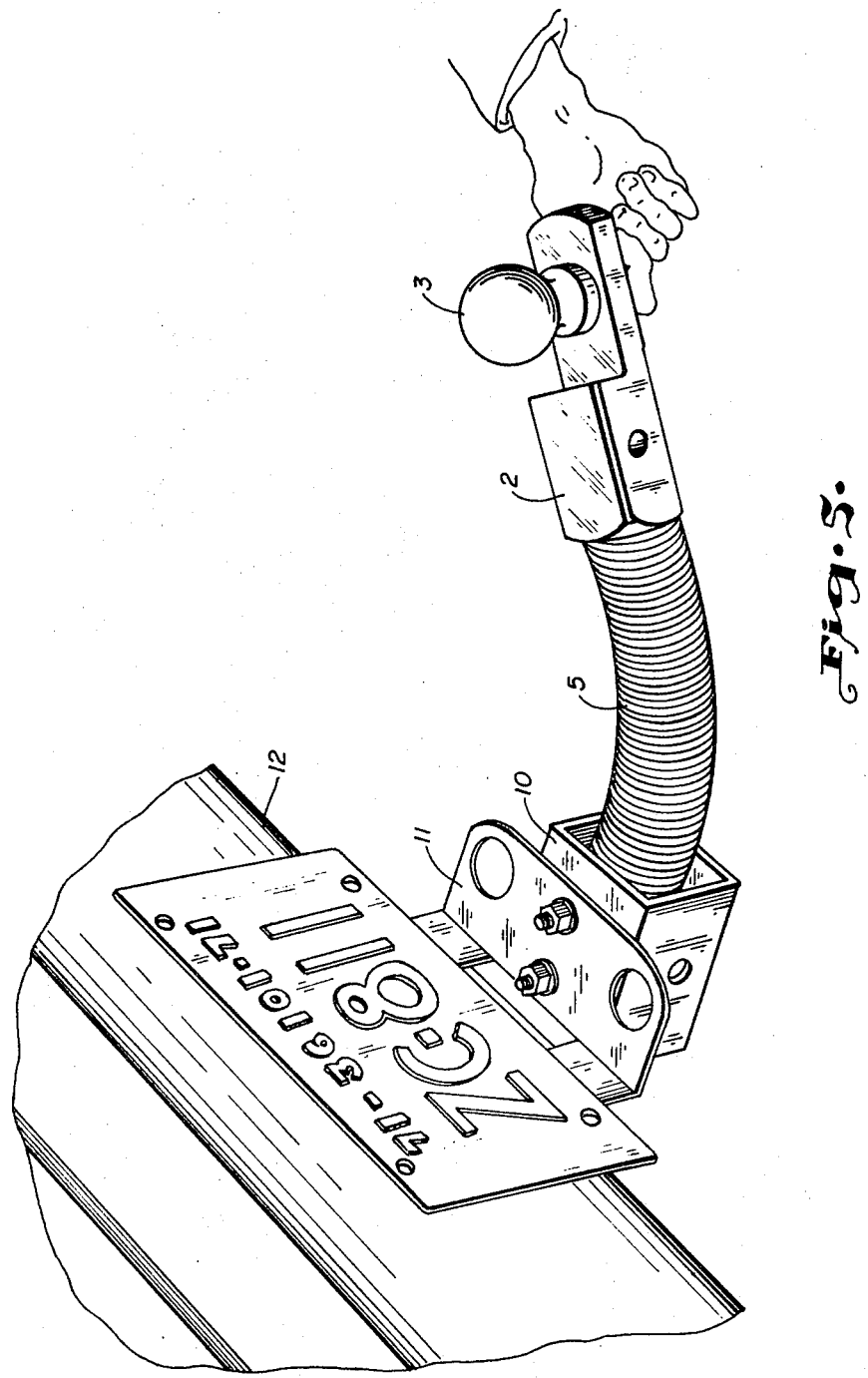

AN EXTENDIBLE RETRACTABLE VEHICULAR HITCH ASSEMBLY

BACKGROUND OF INVENTION

Many trailer and hitching devices are now available on the market for connecting automotive vehicles and trailers in tandem and/or for connecting two vehicles together into a owing position. However, the hitching devices presently available do not have the ability for easy hitching of the vehicle to be towed. The hitching means presently available require the trailer to be directly aligned with the tongue on the vehicle to be towed. To directly align the vehicles in a towing position in this manner is awkward and tedious. To alleviate this problem, I have invented a new device which is functional, easy to operate and includes features heretofore not found in towing hitch devices.

SUMMARY OF THE INVENTION

The principal object of this invention is to provide an extendible retractable hitch assembly which can be gyrated in a 360° circle, moving laterally in many directions to facilitate connecting one or more vehicles into a towing position.

Another object of this invention is to provide flexible means of connection which can be retracted into a box sleeve which is mounted on the towing vehicle.

Still another object of this invention is to furnish means to maintain the extendible retractable towing device in a locked position in a box sleeve mounted on the towing vehicle. Further and additional objects will appear from the description, accompanying drawings and appended claims.

In accordance with the embodiment of this invention, the extendible retractable vehicular hitch is manufactured from high grade steel with component parts integrated into a complete unit to provide an extendible hitch. The hitch is unitized construction with a machined block with or without a steel cable and a spring attached to the machine block to give rigidity and flexibility to the structure.

A safety locking device is incorporated in a box sleeve to secure the towing hitch in a rigid position when a trailer or a second vehicle is in towing position. The sleeve itself being mounted to the frame of the towing vehicle.

DESCRIPTION

For a more complete understanding of the invention, reference should be made to the drawings herein.

FIG. 1 is a perspective drawing with a sectional cutout showing the extendible hitch assembly using two coiled springs.

FIG. 2 is a perspective drawing showing the extendible hitch assembly in a retracted position in a holding device in the form of a box sleeve.

FIG. 3 is a perspective drawing with a sectional cutout of the extendible hitch assembly using a single spring coil for an automobile trailer attachment.

FIG. 4 is a perspective drawing showing the use of an optional means of a spring-loaded latch device for holding the extendible hitch assembly in a fixed retracted position.

FIG. 5 is a perspective drawing showing the extendible hitch assembly mounted on a vehicle in an extended position.

Referring now to the drawings, particularly FIG. 1, the extendible hitch assembly is shown with a sectional cutout to better illustrate the structure of the hitch assembly, one end of which is a machined block 2 with provision for mounting a ball connector 3. The machined block 2 is extended on one end into a partially center drilled cylindrical section which is swaged into and made integral with steel cable 9. Steel cable 9 and the cylindrical extension of machined block 2 is encircled with a steel spring 5 which is attached to one end of the machined block 2, extending over the cylindrical extension of machined block 2. To add additional rigidity to the extendible hitch 1 a second steel spring 6 (optional) is positioned over cable 9 and inside of steel spring 5. Both springs 5 and 6 are held in position by stop plate 7 which is placed around cable 9 directly in front of cable plug 8. Cable plug 8 is swaged onto the end of cable 9. Stop plate 7 is positioned approximately perpendicular to cable 9 forward from plug 8. Stop plate 7 is sized to rest against sleeve 10 when the vehicle hitch 1 is extended to prevent the cable 9 from sliding out of the sleeve 10. This also acts as an added safety feature. When the cable 9 is in the retracted position, machined block 2 is positioned in box sleeve 10 and holding pin 4 is inserted through sleeve 10 into machined block 2 with the safety lock 15 in a vertical position to prevent the pin 4 from slipping out.

Reference is made to FIG. 2 which shows machined block 2 with ball 3 attached in a retracted position in box sleeve 10 with safety holding pin 4 in place. In this position the extendible vehicle hitch 1 is in running position.

Reference is made to FIG. 3 which shows a modified structure of the extendible hitch 1 as shown in FIG. 1. In this modification, spring 5 attached to block 2 encircling the cylindrical extension of block 2. This modification shows the use of only one spring 5 as a guiding member for the extendible hitch assembly. The spring 5 is attached to block 2 at position 12, FIG. 3. This modification, because it does not include cable 9, stop plate 7 or swaged plug 8, FIG. 1, can be completely removed from box sleeve 14 when not in use and placed in storage. Extendible hitch 11 is also shown with a recess 13 into which spring loaded latch 4', FIG. 4 will lock extendible hitch 11 into place for preparation for a towing operation.

Reference is made to FIG. 4 which portrays the box sleeve 14 with a modified latch 4' mounted on the top surface of box sleeve 14. The latch 4' is assembled with a spring loaded catch (not shown) which drops in recess 13, FIG. 3 machined in the top surface of the machined block 2, FIG. 3. When the extendible hitch 1, FIG. 3 is retracted, the catch on the spring loaded latch 4' falls into recess 13, FIG. 3 on the top surface of the machined block 2 to hold the extendible hitch firmly in sleeve 14.

Reference is made to FIG. 5 which shows the extendible hitch assembly 1 in an extended position with box sleeve 10 attached by bolts to bracket 11 which is mounted on the towing vehicle 12. Spring 5 is shown in a bent position to illustrate the flexibility of the hitch 1, FIG. 1 to provide easier hook up of a trailer onto ball 3.

It will, of course, be understood that various details of construction may be varied through a wide range without departing from the principles of this invention, and it is, therefore, not the purpose to limit the patent granted herein otherwise than necessitated by the disclosure.

I claim:

1. An extendible vehicular hitch mounted on a towing vehicle for pivotly interconnecting a trailer with a towing vehicle, the said extendible hitch comprising
   a. a machined block with means for attaching a towing ball,
   b. the said machined block extending on one end into a circular body,
   c. the said machined block supporting at least one coiled spring attached thereto at one end thereof, the said spring encircling the said circular body and engaging the towing vehicle at its opposite end,
   d. a sleeve attached to the said towing vehicle for receiving and holding the said machined block and spring in a stationary position, the said sleeve having means for securing the said machined block in a fixed position to the towing vehicle.

2. The extendible vehicular hitch as claimed in claim 1 wherein a cable is swaged into the end of the said circular body, the said cable extending through the said coiled spring and through the said sleeve; the said cable having a plug swaged on the end of the said cable and a stop plate positioned between said sleeve and said plug approximately perpendicular to the said cable.

3. The extendible vehicular hitch as claimed in claim 1 where the said means in the said sleeve for holding the machined block in a fixed position is a holding pin.

4. The extendible vehicular hitch as claimed in claim 1 where the surface at the said machined block has a recess therein, and positioned on the surface of the said sleeve is a spring loaded latch, the said spring loaded latch providing means to hold the said machined block securely in a locked position in the said sleeve when the said spring loaded latch is in alignment with the said recess in the said machined block.

* * * * *